United States Patent
Karout et al.

(10) Patent No.: US 9,980,293 B2
(45) Date of Patent: May 22, 2018

(54) RANDOM ACCESS PROCEDURE

(71) Applicant: Telefonaktiebolaget LM Ericsson (publ), Stockholm (SE)

(72) Inventors: Johnny Karout, Göteborg (SE); Magnus Stattin, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 38 days.

(21) Appl. No.: 15/116,573

(22) PCT Filed: Jan. 16, 2015

(86) PCT No.: PCT/SE2015/050038
§ 371 (c)(1),
(2) Date: Aug. 4, 2016

(87) PCT Pub. No.: WO2015/119555
PCT Pub. Date: Aug. 13, 2015

(65) Prior Publication Data
US 2016/0360516 A1 Dec. 8, 2016

(51) Int. Cl.
*H04W 74/08* (2009.01)
*H04L 1/00* (2006.01)
(Continued)

(52) U.S. Cl.
CPC ........ *H04W 74/0833* (2013.01); *H04L 1/00* (2013.01); *H04W 72/048* (2013.01);
(Continued)

(58) Field of Classification Search
CPC ......... H04W 74/0833; H04W 74/0841; H04W 88/08; H04B 7/0617
See application file for complete search history.

(56) References Cited

U.S. PATENT DOCUMENTS

2010/0002627 A1  1/2010  Ngo et al.
2010/0118716 A1  5/2010  Lakkis et al.
(Continued)

FOREIGN PATENT DOCUMENTS

GB  2461780 A  1/2010
WO  2009084924 A2  7/2009
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.9.0, Jun. 2009, 1-159.
(Continued)

*Primary Examiner* — Gary Mui
(74) *Attorney, Agent, or Firm* — Sage Patent Group

(57) ABSTRACT

Methods and apparatus for providing a Random Access procedure used by a communications device and an access node, for example the UE (user equipment) and eNodeB (the LTE radio basestation) in an LTE network, to e.g. establish a Radio Resource Control (RRC) connection. An example of a method according to the invention for use in an access node comprises: receiving (42) signals comprising multiple instances of an uplink Random Access message; spatially resolving (44) the received signals to identify (46) directions from which the uplink Random Access message was received; and transmitting (48) distinct downlink Random Access messages in the identified directions from which the uplink Random Access message was received.

13 Claims, 6 Drawing Sheets

(51) Int. Cl.
  *H04W 72/04* (2009.01)
  *H04W 74/00* (2009.01)
  *H04W 88/08* (2009.01)
  *H04W 52/36* (2009.01)

(52) U.S. Cl.
  CPC ..... *H04W 72/0413* (2013.01); *H04W 74/006* (2013.01); *H04W 52/365* (2013.01); *H04W 72/046* (2013.01); *H04W 88/08* (2013.01)

(56) References Cited

U.S. PATENT DOCUMENTS

| | | |
|---|---|---|
| 2011/0014922 A1 | 1/2011 | Jen |
| 2011/0045863 A1 | 2/2011 | Lee et al. |
| 2011/0158104 A1* | 6/2011 | Frenger ............. H04W 74/0833 370/241 |
| 2011/0294513 A1* | 12/2011 | Li ....................... H04W 74/008 455/450 |
| 2012/0250662 A1* | 10/2012 | Kuo ........................ H04W 4/20 370/336 |
| 2013/0083695 A1 | 4/2013 | Narasimha et al. |
| 2013/0201920 A1* | 8/2013 | Takano .............. H04W 76/021 370/328 |
| 2013/0336268 A1* | 12/2013 | Better ............... H04W 56/0005 370/329 |
| 2014/0010178 A1* | 1/2014 | Yu ..................... H04W 74/0833 370/329 |
| 2015/0382205 A1* | 12/2015 | Lee ....................... H04B 7/0417 370/329 |
| 2016/0029358 A1* | 1/2016 | Hou ..................... H04B 7/0695 370/329 |
| 2016/0309367 A1* | 10/2016 | Li ....................... H04L 12/6418 |

FOREIGN PATENT DOCUMENTS

| | | |
|---|---|---|
| WO | 2010124228 A2 | 10/2010 |
| WO | 2013020209 A1 | 2/2013 |
| WO | 2013042908 A1 | 3/2013 |
| WO | 2014204365 A1 | 12/2014 |

OTHER PUBLICATIONS

3GPP, "3rd Generation Partnership Project; Technical Specification Group Radio Access Network; Evolved Universal Terrestrial Radio Access (E-UTRA) Medium Access Control (MAC) protocol specification (Release 9)", 3GPP TS 36.321 V9.0.0, Sep. 2009, 1-47.

* cited by examiner

RANDOM ACCESS PROCEDURE

TECHNICAL FIELD

This relates to a Random Access procedure used by a communications device and an access node, for example the UE (user equipment) and eNodeB (the LTE radio basestation) in an LTE network, to e.g. establish a Radio Resource Control (RRC) connection.

BACKGROUND

In an LTE (Long Term Evolution) network, a user equipment device (UE) has its uplink synchronized with respect to time. Therefore, a UE which has not yet obtained or has lost its uplink time synchronization must initiate the Random Access (RA) procedure to obtain uplink time alignment. After that, the eNodeB might grant the UE transmission resources.

The LTE specification 3GPP TS 36.321 version 9.0.0 ("Evolved Universal Terrestrial Radio Access (E-UTRA); Medium Access Control (MAC) protocol specification), section 5.1 and the LTE specification 3GPP TS 36.300 version 8.9.0 ("Evolved Universal Terrestrial Radio Access (E-UTRA); Evolved Universal Terrestrial Radio Access Network (E-UTRAN), section 10.1.5 define the Random Access (RA) procedure.

To summarise this procedure, a Physical Random Access Channel (PRACH) is provided for the UE to request access to the network. A UE performing RA randomly picks a preamble out of a pool and transmits it. The preamble represents a random UE ID which can be used by the eNodeB when granting the UE access to the network. The eNodeB receiver can resolve RA attempts performed with different preambles and send a response message to each UE using the corresponding random UE IDs. The UE then sends a scheduled transmission.

However, because multiple UEs can request access at the same time, collisions may occur between requesting UEs using the same preamble, and each UE will attempt to send a scheduled transmission. A contention resolution scheme has therefore been implemented to separate the UE transmissions.

However, if multiple UEs simultaneously use the same preamble a collision occurs and some or all of the RA attempts will fail, because the eNodeB cannot distinguish between the multiple users with the same random UE ID.

Thus, collisions between transmissions in the contention-based RA procedure may lead to increased delay and failed access attempts. This limits the RA capacity and/or makes it costly (in terms of resources) to handle high RA intensities. Such limitation is particularly disadvantageous when uplink transmission (necessitating RA) is needed for proper traffic prioritization/handling. This becomes critical in high load and emergency scenarios with many UEs trying to acquire transmission resources.

SUMMARY

According to an aspect of the invention, there is provided a method, for use in an access node of a cellular communications network. The method comprises: receiving signals comprising multiple instances of an uplink Random Access message; spatially resolving the received signals to identify directions from which the uplink Random Access message was received; and transmitting distinct downlink Random Access messages in the identified directions from which the uplink Random Access message was received.

The uplink Random Access message may comprise a Random Access preamble. The method may comprise transmitting the distinct downlink Random Access messages granting different resources for subsequent uplink messages. The uplink Random Access message may be a Random Access Message 3. The access node may be an eNodeB. The multiple instances of the uplink Random Access message may be identical, or may have different content.

According to an aspect of the invention, there is provided a method, for use in an access node of a cellular communications network. The method comprises: receiving signals comprising multiple instances of an uplink Random Access message; and transmitting distinct downlink Random Access messages in multiple directions.

The uplink Random Access message may comprise a Random Access preamble. The method may comprise transmitting the distinct downlink Random Access messages granting different resources for subsequent uplink messages. The method may comprise transmitting the distinct downlink Random Access messages granting different resources for subsequent uplink Message 3 transmissions. The access node may be an eNodeB. The multiple instances of the uplink Random Access message may be identical, or may have different content.

According to an aspect of the invention, there is provided a method, for use in an access node of a cellular communications network. The method comprises: receiving signals comprising multiple instances of an uplink Random Access message; transmitting a first downlink Random Access message in response to the received signals at a first power; and subsequently transmitting a second downlink Random Access message in response to the received signals at a second power, wherein the second power is higher than the first power.

The uplink Random Access message may comprise a Random Access preamble. The uplink Random Access message may be a Random Access Message 3. The access node may be an eNodeB. The multiple instances of the uplink Random Access message may be identical, or may have different content.

According to an aspect of the invention, there is provided a method, for use in an access node of a cellular communications network. The method comprises: receiving signals comprising multiple instances of an uplink Random Access message; spatially resolving the received signals to identify approximate locations from which the uplink Random Access message was transmitted; and transmitting distinct downlink Random Access messages for reception in the identified approximate locations from which the uplink Random Access message was transmitted.

The method may comprise spatially resolving the received signals to identify directions from which the uplink Random Access message was transmitted. The method may comprise spatially resolving the received signals to identify approximate distances from which the uplink Random Access message was transmitted. The uplink Random Access message may comprise a Random Access preamble. The uplink Random Access message may be a Random Access Message 3. The access node may be an eNodeB. The multiple instances of the uplink Random Access message may be identical, or may have different content.

According to further aspects of the invention there are provided access nodes and computer program products corresponding to the methods recited above.

This provides a method which arms to reduce collisions between random access attempts, and therefore improve the random access load utilization, thus reducing latency and limiting failure rates in random access attempts. Even if there is a collision between initial messages in random access attempts, the collision is resolved before subsequent messages. This further provides a device operating in accordance with the method.

DETAILED DESCRIPTION

Figure 1:
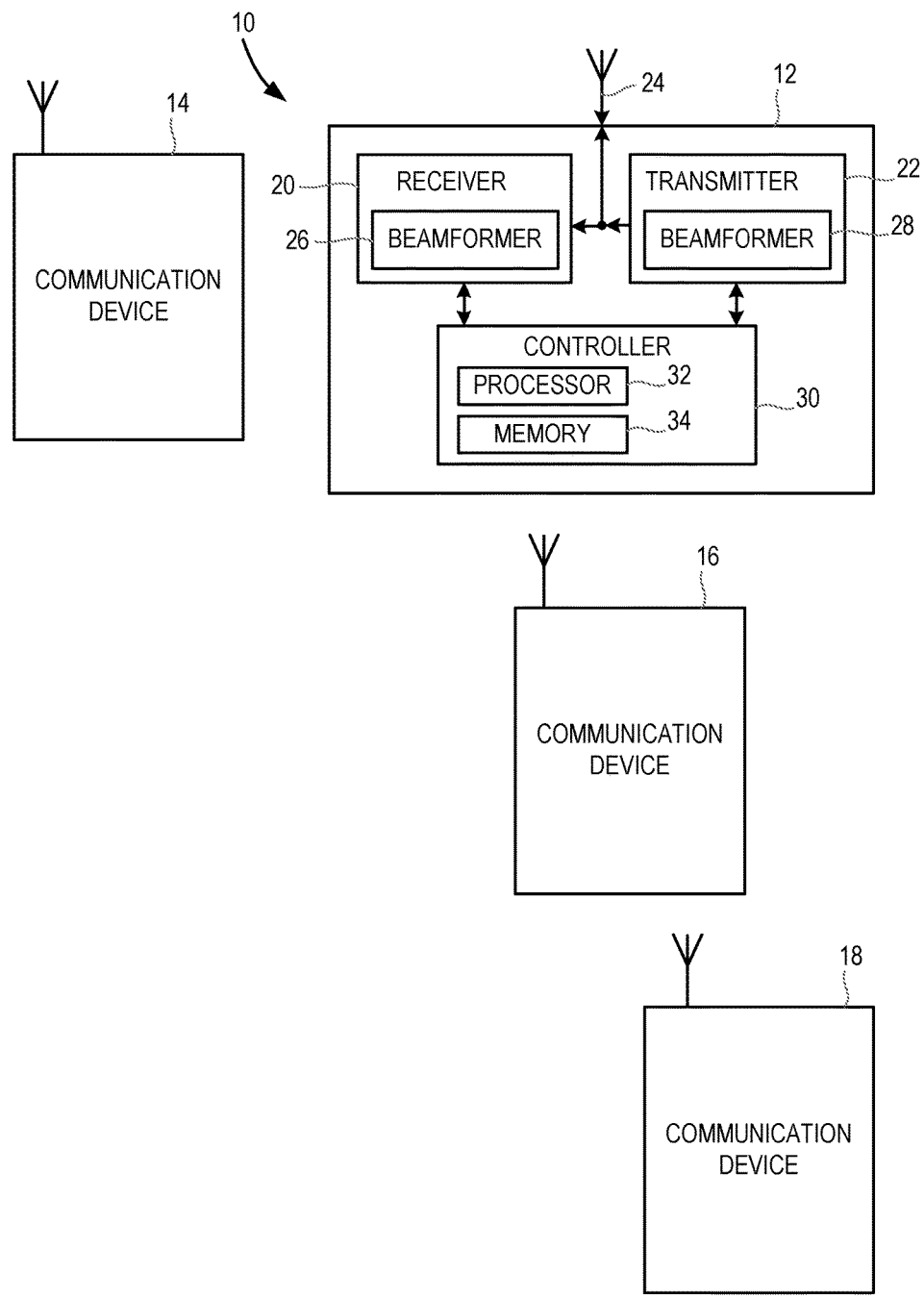
FIG. 1 is a block diagram illustrating a part of a radio access network in accordance with an embodiment.

FIG. 1 shows a part of a radio access network 10. Specifically, FIG. 1 shows an access node 12 and three communication devices 14, 16, 18. The invention will be described further with reference to a specific example in which the radio access network 10 is an Evolved Universal Terrestrial Radio Access Network (E-UTRAN), as defined in the 3rd Generation Partnership Project (3GPP) LTE specifications. In this example, the access node 12 may be an eNodeB (LTE radio basestation) and the communication devices 14, 16, 18 may be user equipment (UE) devices. However, it will be appreciated that the techniques described herein may be used in other networks, or in other nodes of a network.

The access node 12 contains a receiver block 20, and a transmitter block 22, for communicating over a wireless interface with the UE devices by means of an antenna system 24. This communication is generally in accordance with the existing LTE specifications, except as described in more detail below. In some embodiments, the receiver block 20 contains functionality enabling it to determine a direction from which its received signals were transmitted. In the illustrated embodiment, the receiver block 20 contains a beamformer 26 and the antenna system 24 contains multiple antenna elements, such that the receiver block 20 is able to determine the direction from which its received signals were transmitted. Similarly, in some embodiments, the transmitter block 22 contains functionality enabling it to transmit signals in particular directions rather than omnidirectionally. In the illustrated embodiment, the transmitter block 22 contains a beamformer 28 and the antenna system 24 contains multiple antenna elements, such that the transmitter block 22 is able to transmit signals directionally.

The access node 12 further includes a controller block 30, for controlling the operation of the receiver block 20 and the transmitter block 22, amongst other things. The controller block 30 includes a processor 32 and a memory 34, for storing instructions in a non-transitory form, for example in the form of a computer program, for causing the access node to operate in accordance with the methods described herein. The computer program, comprising the instructions, may be provided as a separate product to be loaded into the controller.

The UE devices 14, 16, 18 may be conventional, that is, operating in accordance with the existing LTE specifications.

In modern cellular radio systems, the radio network controls the behavior of the terminal (alternatively referred to as a communication device or user equipment, UE). Uplink transmission parameters such as frequency, timing, and power are regulated via downlink control signaling from the base station to the terminal. For instance, by time-aligning the uplink (UL) transmissions, orthogonality between UEs can be achieved in the time domain, and this is necessary since the radio resources are scarce.

At power-on, or after a long standby time, the UE is not synchronized in the uplink. The UE can derive an uplink frequency and power estimate from the downlink (control) signals. However, a timing estimate is difficult to make since the round-trip propagation delay between the eNodeB and the UE is unknown. So, even if the UE uplink timing is synchronized to the downlink, it may arrive too late at the eNodeB receiver because of the propagation delays. Therefore, before commencing traffic, the UE has to carry out a Random Access (RA) procedure to the network. After the RA, the eNodeB can estimate the timing misalignment of the UE uplink and send a correction message to the UE. During the RA, uplink parameters like timing and power are not very accurate. This poses extra challenges to the dimensioning of a RA procedure.

Figure 2:
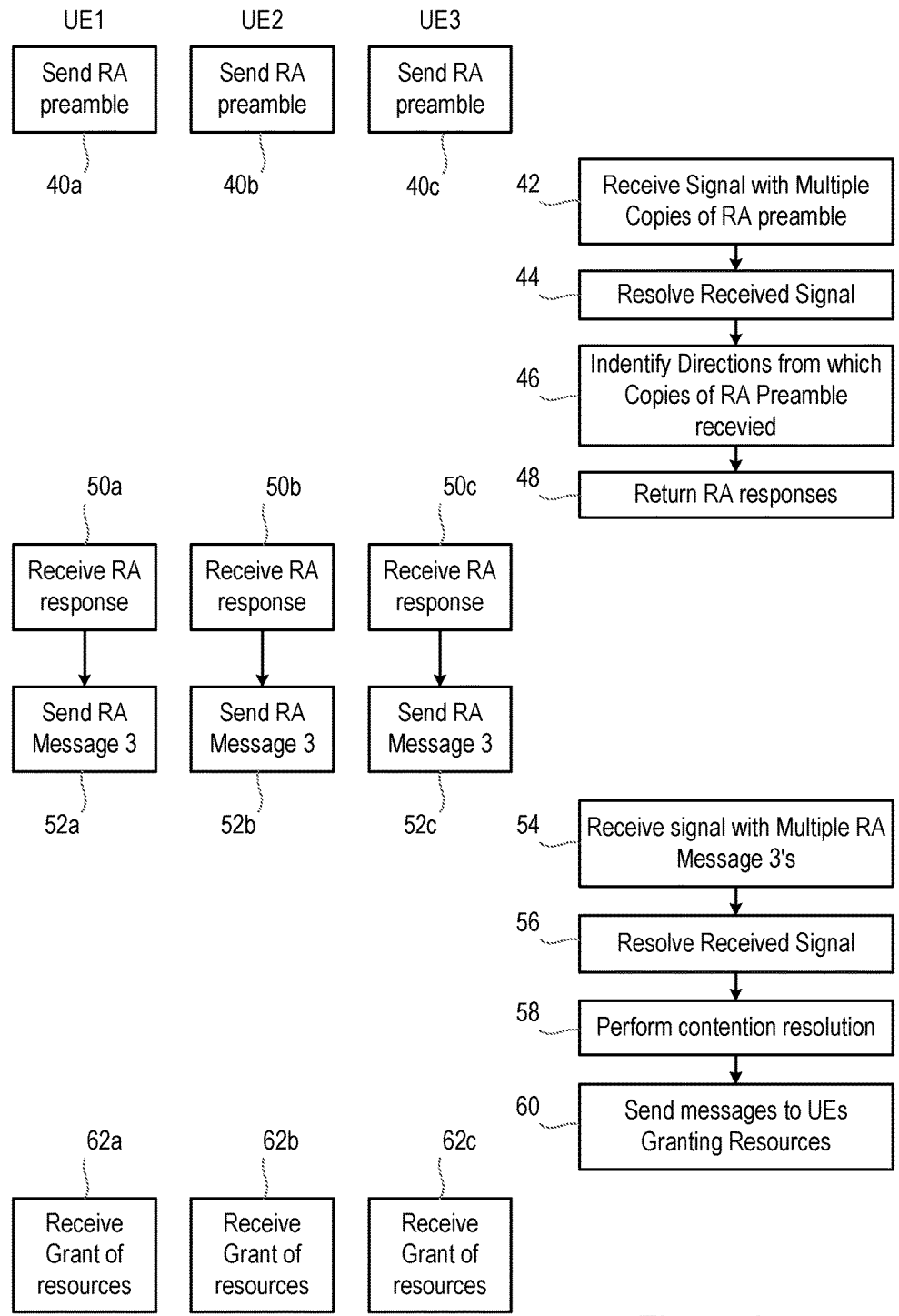
FIG. 2 is a flow chart, illustrating a method in accordance with a first embodiment.

FIG. 2 illustrates a process performed in a specific situation, shown by way of example, in which three user equipment devices (UEs) are requesting access to the network.

In this embodiment, a Physical Random Access Channel (PRACH) is provided for the UE to request access to the network. When requesting access, a RA preamble is used which is based on a specific sequence with good auto-correlation. Because multiple UEs can request access at the same time, it is recognized that collisions may occur between requesting UEs. A contention resolution scheme has to be implemented to separate the UE transmissions. To distinguish between different UEs performing the RA procedure, multiple different preambles exist. To minimize the probability of collision, the set of available sequences should be large. In LTE the number of provided sequences per cell and RA opportunity is 64. Preambles assigned to adjacent cells are typically different, so that a RA attempt in one cell does not trigger any RA events in a neighboring cell.

A UE performing RA randomly picks a preamble out of a pool and transmits it. The preamble represents a random UE ID which can be used by the eNodeB when granting the UE access to the network. When the eNodeB receiver receives RA attempts from multiple UEs performed with different preambles, it is able to resolve these, and send a response message to each UE using the corresponding random UE IDs. In that case, the eNodeB can perform separate RA procedures with the multiple UEs, and grant suitable resources to each.

LTE defines different RA configurations that differ in the amount of offered RA opportunities. A RA opportunity is approximately 1 MHz wide and either 1, 2, or 3 ms long. Within this time, the UE can transmit the RA preamble. In the configuration with the lowest number of opportunities, one opportunity is offered every second radio frame, i.e. every 20 ms. On the other extreme, the configuration with the highest density of RA opportunities offers one RA opportunity every subframe, i.e., every millisecond.

FIG. 2 illustrates a situation in which multiple UEs (specifically, in this example, three UEs, identified as UE1, UE2 and UE3) initiate the RA procedure, sending the same RA preamble during the same RA opportunity on the same frequency (or otherwise effectively coincident), as shown at steps 40a, 40b, 40c. A situation in which multiple UEs choose the same preamble is likely to happen because there is a limited number of RA preambles, and the likelihood of this collision increases with an increased load on the network. This leads to the risk that the RA attempts will not be successful, since the eNodeB cannot distinguish between the two users with the same random UE ID.

The eNodeB receiver listens at all RA opportunities to detect preambles. In case a preamble is successfully detected, a RA response that includes an identifier of the detected preamble is sent in a special message on the downlink (DL).

In the example shown in FIG. 2, the eNodeB receives a signal at step 42. This received signal contains multiple copies, or instances of the RA preamble transmitted by the three UEs UE1, UE2 and UE3. The multiple copies of the RA preamble may be slightly offset from each other in time, but this could occur if a single UE transmits an RA preamble over a channel that results in multipath propagation.

In step 44, the eNodeB takes steps to resolve the signal received at step 42, in order to determine if it contains components transmitted by different UEs. For example, where the eNodeB receiver contains a beamformer, the step of resolving the signal involves identifying components of the signal received at step 42 that have been transmitted from different directions.

Thus, in step 46, the eNodeB is able to identify the directions from which the different components have been transmitted. Specifically, in this example, the eNodeB is able to recognize that the different components have been transmitted from different UEs.

Thus, in step 48, the eNodeB sends three separate RA responses on the downlink. In this example, the eNodeB transmitter includes a beamformer corresponding to the beamformer in the eNodeB receiver, and so the three responses can be transmitted in distinct directions, with those directions corresponding to the directions from which the components of the received signal were received. The three responses can be sent at different times, but alternatively they can be sent at the same time.

The three separate RA responses sent by the eNodeB may grant separate uplink resources (for example different times and/or frequencies) for UEs to send their subsequent Message 3 responses.

In the illustrated embodiment, the eNodeB sends three separate RA responses on the downlink in distinct directions, granting separate uplink resources for UEs to send their subsequent Message 3 responses, having identified those directions as being directions from which the components of the received signal were received. However, multiple spatially separated responses can be sent, granting separate resources for the Message 3 responses, even without spatially distinguishing the received uplink messages containing the RA preambles.

A terminal that has recently performed a RA attempt listens for a RA response within a certain time window after the preamble has been sent. Each of the three UEs, UE1, UE2 and UE3, therefore receives the respective RA response, as shown at steps 50a, 50b, 50c.

As defined in the LTE specifications (3GPP TS 36.321 and/or 36.300), this causes each of the three UEs to transmit a respective RA message 3, containing amongst other things the Radio Resource Control (RRC) connection request, as shown at steps 52a, 52b, 52c.

As shown at step 54, the eNodeB receives a signal containing multiple copies, or instances, of the RA message 3. As mentioned above, the RA responses sent by the eNodeB at step 48 may have granted separate resources to the UEs for sending their respective Message 3. In that case, the eNodeB should be able to distinguish between the Message 3's based on their use of those resources. Also, the respective Message 3 transmissions will typically have different content (that is, they will comprise different identifiers). However, if, as before, the Message 3's are sent using the same resources (in which case the respective Message 3 transmissions might be identical), the eNodeB is able by means of the receiver beamformer to resolve the received signal into the separate Message 3's received from each UE, as shown at step 56. In this case, the step of spatially resolving the received signal into the separate Message 3's can be aided by using information about the directions from which the uplink messages containing the RA preambles were received.

At step 58, the eNodeB performs the contention resolution procedure to allocate resources to the three UEs and, in step 60, the eNodeB sends messages to the three UEs UE1, UE2 and UE3, granting any allocated resources to the UEs. Using the beamformer in the eNodeB transmitter, the three responses can be transmitted in distinct directions, with those directions corresponding to the directions from which the signals were received from the UEs.

In other examples, the eNodeB sends three separate resource allocation messages on the downlink to the three UEs, using different times and/or frequencies to differentiate between the responses.

In steps 62a, 62b, 62c, the three UEs UE1, UE2 and UE3 receive their respective messages, granting the allocated resources. This can be followed by further uplink and downlink transmission between the UEs and the eNodeB using the respective allocated resources.

Figure 3:
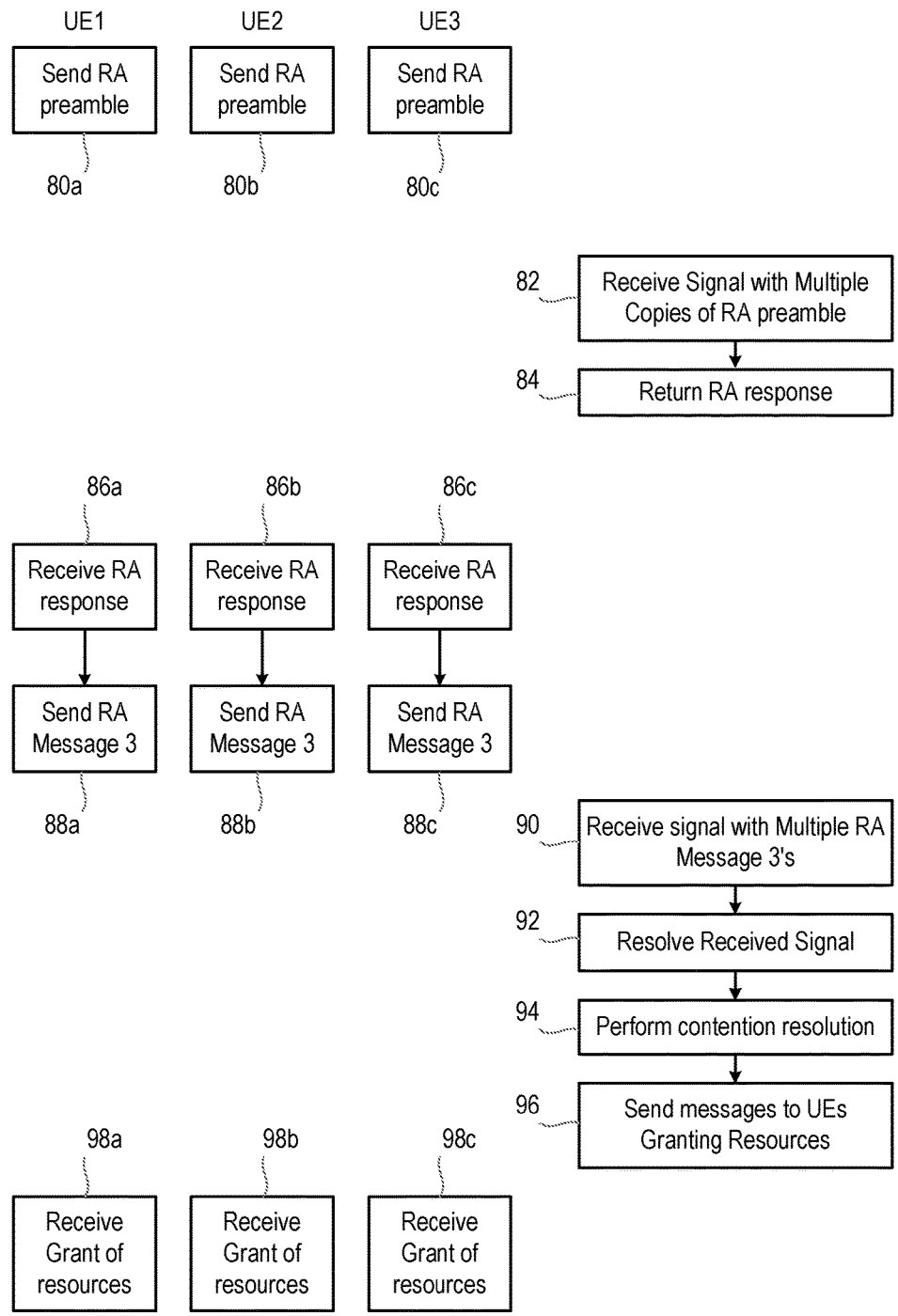
FIG. 3 is a flow chart, illustrating a method in accordance with a second embodiment.

FIG. 3 is a flow chart showing an alternative process, again in a situation in which multiple UEs (specifically, in this example, three UEs, identified as UE1, UE2 and UE3) initiate the RA procedure, sending the same RA preamble during the same RA opportunity on the same frequency (or otherwise effectively coincident), as shown at steps 80a, 80b, 80c.

The eNodeB receiver listens at all RA opportunities to detect preambles. In case a preamble is successfully detected, a RA response that includes the number of the detected preamble is sent in a special message on the downlink (DL).

In the example shown in FIG. 3, the eNodeB receives a signal at step 82. This received signal contains multiple copies, or instances, of the RA preamble transmitted by the three UEs UE1, UE2 and UE3. The multiple copies of the RA preamble may be slightly offset from each other in time, but this could occur if a single UE transmits an RA preamble over a channel that results in multipath propagation.

Thus, in step 88, the eNodeB sends a single RA response on the downlink, as defined in the LTE specifications (3GPP TS 36.321 and/or 36.300).

A terminal that has recently performed a RA attempt listens for a RA response within a certain time window after the preamble has been sent. Each of the three UEs, UE1, UE2 and UE3, therefore receives the same RA response, as shown at steps 86a, 86b, 86c.

As defined in the LTE specifications (3GPP TS 36.321 and/or 36.300), this causes each of the three UEs to transmit a respective RA message 3, containing amongst other things the Radio Resource Control (RRC) connection request, as shown at steps 88*a*, 88*b*, 88*c*.

As shown at step 90, the eNodeB receives a signal containing multiple copies, or instances, of the RA message 3.

In step 92, the eNodeB takes steps to resolve the signal received at step 90, in order to determine if it contains components transmitted by different UEs. For example, where the eNodeB receiver contains a beamformer, the step of resolving the signal involves identifying components of the signal received at step 90 that have been transmitted from different directions.

Thus, in step 94, the eNodeB is able to identify the directions from which the different components have been transmitted. Specifically, in this example, the eNodeB is able to recognize that the different components have been transmitted from different UEs.

Having recognized that the signal received at step 90 contains copies, or instances, of the RA Message 3 from multiple UEs, at step 92, the eNodeB performs the contention resolution procedure to allocate resources to the three UEs at step 94 and, in step 96, the eNodeB sends separate messages to the three UEs UE1, UE2 and UE3, granting the allocated resources to the UEs. Using the beamformer in the eNodeB transmitter, the three responses can be transmitted in distinct directions, with those directions corresponding to the directions from which the signals were received from the UEs.

In other examples, the eNodeB sends three separate resource allocation messages on the downlink to the three UEs, using different times and/or frequencies to differentiate between the responses.

In steps 96*a*, 96*b*, 96*c*, the three UEs UE1, UE2 and UE3 receive their respective messages, granting the allocated resources. This can be followed by further uplink and downlink transmission between the UEs and the eNodeB using the respective allocated resources.

Thus, the eNodeB can determine the direction of the initial UE transmissions containing the RA preambles, and can then transmit the RA responses directionally to the corresponding UEs based on information about their directions. In another example, the eNodeB can transmit the RA responses directionally, without prior knowledge of the directions of the UEs.

When the UEs have already been separated spatially, they can be granted different uplink (time/frequency) resources for their Message 3 transmissions, thus avoiding collisions. In this case, spatial separation of the Message 3 transmissions may not be required.

However, in other examples, the eNodeB may use directional information to spatially resolve multiple Message 3 signals received on the same uplink (time/frequency) resources and may then also use that information to spatially separate the transmissions in response to the Message 3 signals.

For example, the eNB could acquire information about directionality of the initial RA preambles, and use that information to assist receiving directionally the Message 3 transmissions. Alternatively, the eNodeB can carry out directional reception of the Message 3 transmissions without directional information from previous steps. If the eNodeB detects the direction of the Message 3 transmissions, it can use this information to transmit its responses directionally.

Thus, in these embodiments, the eNodeB uses information about the direction of the UE (e.g., from beamforming or another technique for detecting the direction of received signal(s)) to enable spatial partitioning of UEs and/or access attempts. Thereby, the eNodeB is enabled to handle or successfully detect a number of RA preamble transmissions and/or Message 3s from UEs who initiate the RA procedure with the same preamble concurrently. The number of RA preamble transmissions and/or Message 3s that can be handled depends on the eNodeB spatial/directional partitioning capabilities. This reduces the number of collisions and failed access attempts, thereby improving the contention resolution and access efficiency.

Therefore, due to this spatial separation, the eNodeB is enabled to treat the UEs separately, thus allowing access to resources without having collisions or repeated access attempts. If the eNodeB cannot spatially differentiate all UEs with the same RA preamble, few of them will have to reinitiate the RA procedure.

Figure 4:
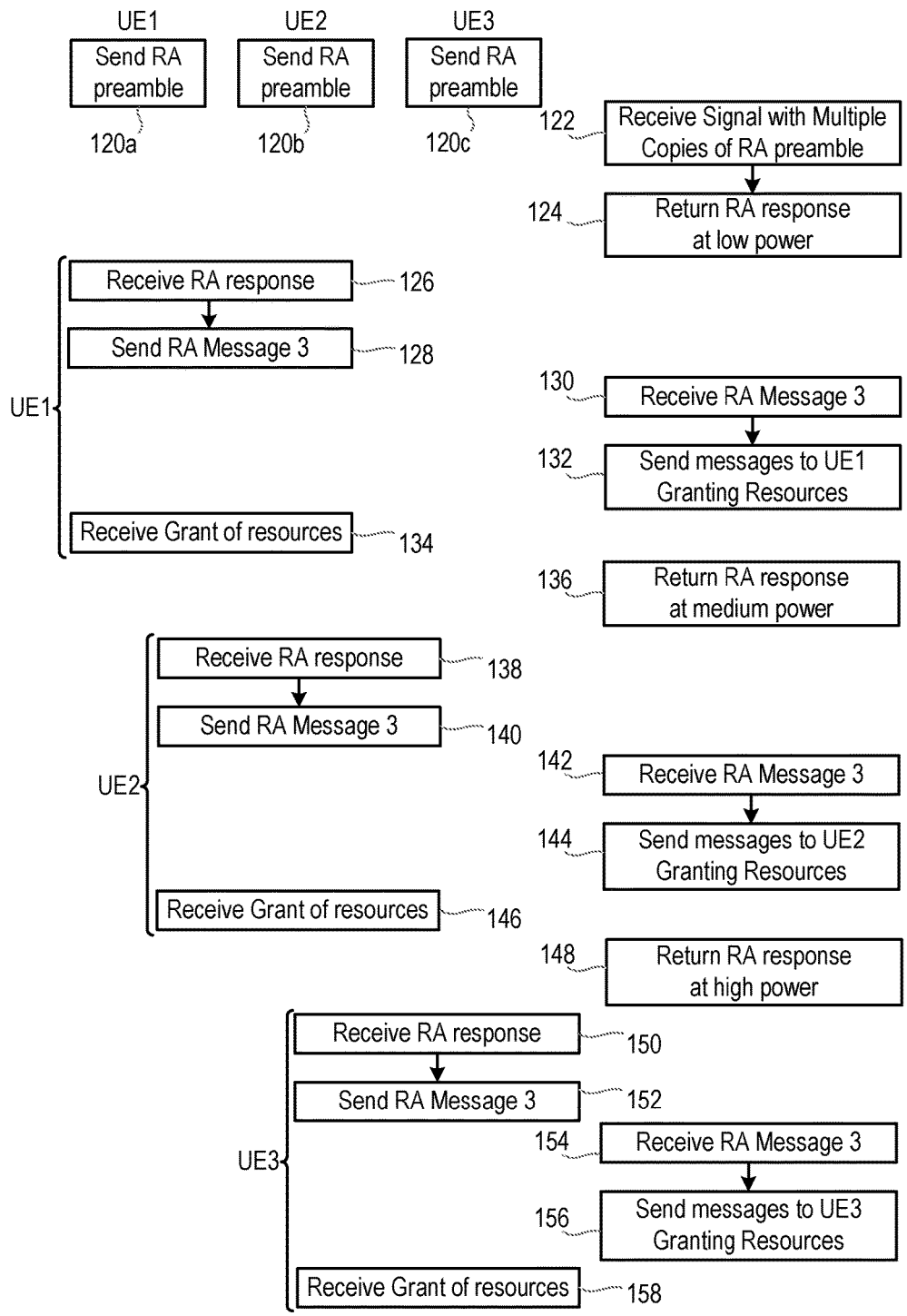
FIG. 4 is a flow chart, illustrating a method in accordance with a third embodiment.

FIG. 4 is a flow chart showing a further alternative process, again in a situation in which multiple UEs (specifically, in this example, three UEs, identified as UE1, UE2 and UE3) initiate the RA procedure, sending the same RA preamble during the same RA on the same frequency (or otherwise effectively coincident), as shown at steps 120*a*, 120*b*, 120*c*.

The eNodeB receiver listens at all RA opportunities to detect preambles. In case a preamble is successfully detected, an RA response that includes an identifier of the detected preamble is sent in a special message on the downlink (DL).

In the example shown in FIG. 4, the eNodeB receives a signal at step 122. This received signal contains multiple copies, or instances, of the RA preamble transmitted by the three UEs UE1, UE2 and UE3. The multiple copies of the RA preamble may be slightly offset from each other in time, but this could occur if a single UE transmits an RA preamble over a channel that results in multipath propagation.

Thus, in step 124, the eNodeB sends a single RA response on the downlink, as defined in the LTE specifications (3GPP TS 36.321 and/or 36.300). In this case, the eNodeB sends the RA response at low power, such that only a UE that is close to the eNodeB will be able to detect the RA response.

A terminal that has recently performed a RA attempt listens for a RA response within a certain time window after the preamble has been sent. In this illustrated example, only one of the three UEs, UE1, is able to receive the RA response transmitted at low power, as shown at step 126.

As defined in the LTE specifications (3GPP TS 36.321 and/or 36.300), this causes UE1 to transmit the RA message 3, containing amongst other things the Radio Resource Control (RRC) connection request, as shown at step 128.

As shown at step 130, the eNodeB receives a signal containing the RA message 3. Then, at step 132, the eNodeB allocates resources to UE1 and sends a message to UE1 granting the allocated resources to UE1.

In step 134, UE1 receives the message granting the allocated resources. This can be followed by further uplink and downlink transmission between UE1 and the eNodeB using the respective allocated resources.

Also, at step 136, the eNodeB sends a further RA response on the downlink, as defined in the LTE specifications (3GPP TS 36.321 and/or 36.300). In this case, the eNodeB sends the RA response at medium power, such that only a UE that is somewhat close to the eNodeB will be able to detect the RA response. Although FIG. 4 shows step 136 taking place after step 132, it will be appreciated that the response at medium power may be sent at any time after the response at low power has been sent (because any UE able to detect the signal at low power will already have detected that earlier signal).

A terminal that has recently performed a RA attempt listens for a RA response within a certain time window after the preamble has been sent. In this illustrated example, the first UE, UE1, is no longer listening for the RA response, and only UE2 (but not UE3) of the two remaining UEs is able to receive the RA response transmitted at medium power, as shown at step 138.

This causes UE2 to transmit the RA message 3, containing amongst other things the Radio Resource Control (RRC) connection request, as shown at step 140.

As shown at step 142, the eNodeB receives a signal containing the RA message 3. Then, at step 144, the eNodeB allocates resources to UE2 and sends a message to UE2 granting the allocated resources.

In step 146, UE2 receives the message granting the allocated resources. This can be followed by further uplink and downlink transmission between UE2 and the eNodeB using the respective allocated resources.

Also, at step 148, the eNodeB sends a further RA response on the downlink, as defined in the LTE specifications (3GPP TS 36.321 and/or 36.300). In this case, the eNodeB sends the RA response at high power, such that even a UE that is somewhat far from the eNodeB will be able to detect the RA response. Although FIG. 4 shows step 148 taking place after step 144, it will be appreciated that the response at high power may be sent at any time after the response at medium power has been sent (because any UE able to detect the signal at medium power will already have detected that earlier signal).

A terminal that has recently performed a RA attempt listens for a RA response within a certain time window after the preamble has been sent. In this illustrated example, UE1 and UE2 are no longer listening for the RA response, and so only UE3 receives the RA response transmitted at high power, as shown at step 150.

This causes UE3 to transmit the RA message 3, containing amongst other things the Radio Resource Control (RRC) connection request, as shown at step 152.

As shown at step 154, the eNodeB receives a signal containing the RA message 3. Then, at step 156, the eNodeB allocates resources to UE3 and sends a message to UE3 granting the allocated resources.

In step 158, UE3 receives the message granting the allocated resources. This can be followed by further uplink and downlink transmission between UE3 and the eNodeB using the respective allocated resources.

Thus, in this embodiment the eNodeB varies the transmission power over time to achieve a spatial partitioning of UEs with the same RA preamble. The eNodeB sends the RA response message several times at different time instants with different power levels. This allows the UE closest to the eNodeB to receive successfully the first RA response, which would allow the UE to proceed with sending the RA message 3. Subsequent to transmitting the first RA response, the eNodeB transmits the same RA response with higher power levels, armed at the UE at further distances. The UE(s) which have successfully received earlier RA responses will not look for further RA responses and, thus, are unaffected by subsequent RA responses. This process can be repeated several times depending on what kind of load the network is experiencing. In this way, UEs with the same RA preamble are separated such that collisions or failure rates are reduced.

The spatial partitioning effectively divides the coverage area of the eNodeB into zones at different distances from the eNodeB These zones do not need to be concentric circles; they may, e.g., be irregular and disjoint. In effect, the sizes and shapes of the zones are determined by the pathlosses from the eNodeB.

This process is repeated depending on the network requirements, whether it is latency or QoS. Thus, the number of zones created can vary, and for UEs in one zone with a similar preamble, a collision might occur and a new attempt of the RA procedure should be initiated. The availability of information about UE transmission powers, e.g., through Power Headroom Reports, can be used, e.g., in determining the transmission powers and/or UE locations, to further improve the accuracy/precision/resolution of the procedure. Having distinguished between the uplink RA messages from the UEs, the eNodeB can either transmit the RA message 4 on different time instants, or on different frequencies regardless of time. In general, once the UEs are distinguished, time, frequency, and/or spatial separation can be used for further communication between the UE and eNodeB, thus avoiding collisions.

Another embodiment of the invention uses a combination of the method described with reference to FIGS. 2 and 3 (differentiating between RA attempts from UEs based on the directions of the UEs from the eNodeB) and the method described with reference to FIG. 4 (differentiating between RA attempts from UEs based on, e.g., the distances of the UEs from the eNodeB, or on the pathlosses between the UEs and the eNodeB).

Thus, when the eNodeB recognizes that it has received a signal containing multiple copies of an uplink RA message (for example containing the RA preamble or the Message 3), it determines the directions from which such messages were received. Having identified these directions, the eNodeB transmits a distinct response message (for example an RA response or a message granting resources, as appropriate) in at least one of the directions from which the message was received. These response messages may be sent with relatively low power, so that they can only be detected by UEs that are relatively close to the eNodeB.

Subsequently, after granting resources to any UE that may reply to the first response messages, the eNodeB transmits a further distinct response message (for example an RA response or a message granting resources, as appropriate) in at least one of the directions from which the message was received (which may be the same direction, or set of directions, or may overlap with the direction or set of directions to which the first response message was sent, or may be distinct therefrom). These response messages may be sent with higher power, so that they can only be detected by UEs that are more distant than the UEs that could detect the first response messages.

This can be repeated as often as required. Thus, FIG. 4 shows an embodiment in which responses are sent at three different power levels, but any number of power levels may be used.

Therefore, UEs using the same RA preamble can be granted resources, not only if they are located in different directional partitions created by the eNodeB, but also if they are co-located in the same partition/space by applying zoning (i.e. distance) separation to avoid collisions. The directional and coverage characteristics can be parameterized by the resources available, network requirements, and network load.

Figure 5A:
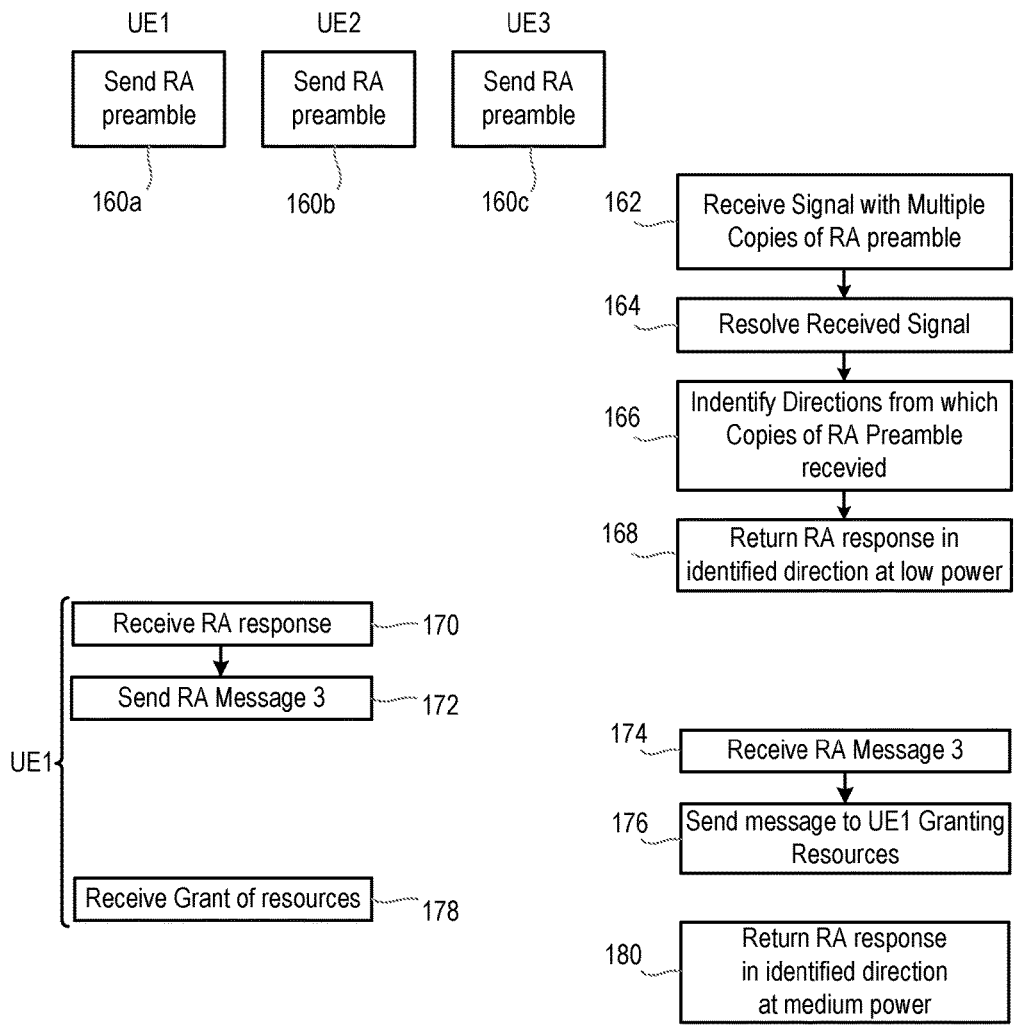
FIG. 5 is a flow chart, illustrating a method in accordance with a fourth embodiment.
Figure 5B:
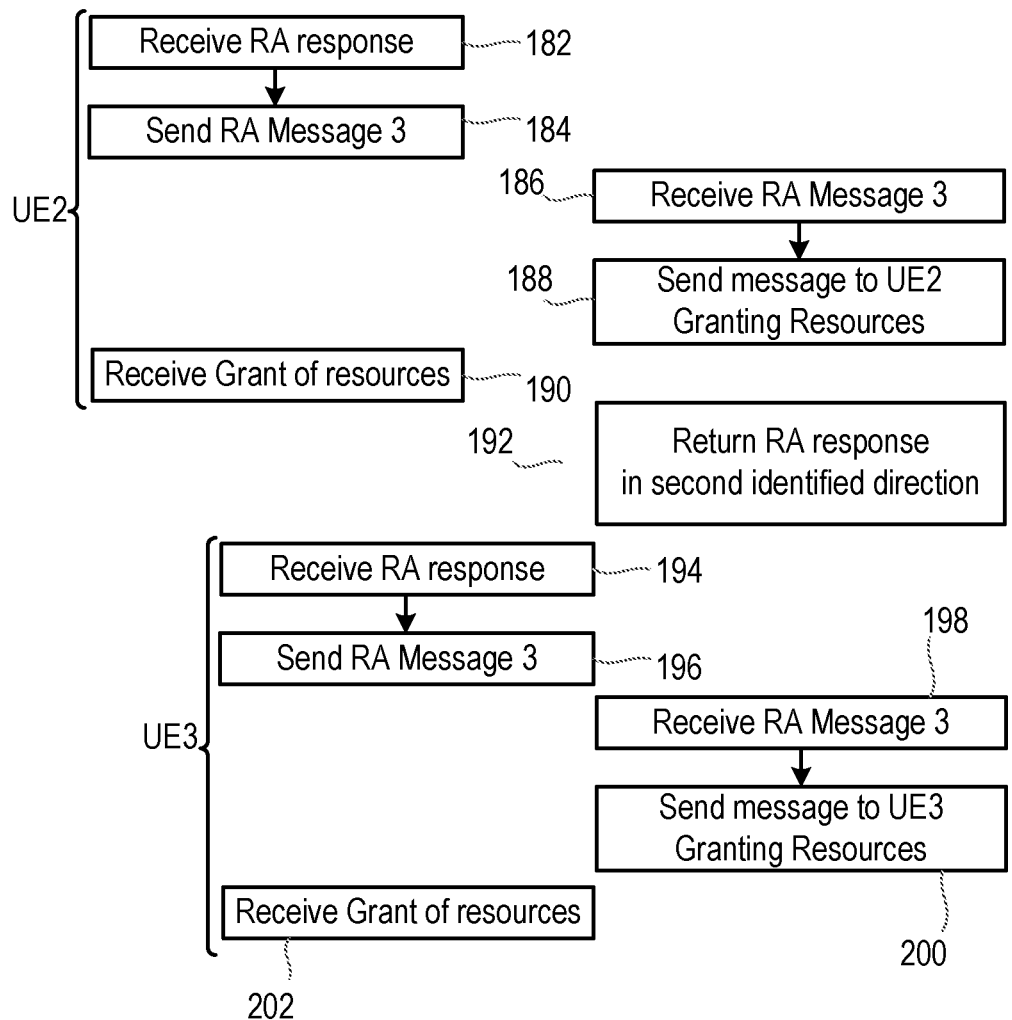

FIG. 5 is a flow chart showing an example of this further alternative process, again in a situation in which multiple UEs (specifically, in this example, three UEs, identified as UE1, UE2 and UE3) initiate the RA procedure, sending the same RA preamble during the same RA on the same frequency (or otherwise effectively coincident), as shown at steps 160*a*, 160*b*, 160*c*.

In the example shown in FIG. 5, the eNodeB receives a signal at step 162. This received signal contains multiple copies, or instances of the RA preamble transmitted by the three UEs UE1, UE2 and UE3. The multiple copies of the RA preamble may be slightly offset from each other in time, but this could occur if a single UE transmits an RA preamble over a channel that results in multipath propagation.

In step 164, the eNodeB takes steps to resolve the signal received at step 162, in order to determine if it contains components transmitted by different UEs. For example, where the eNodeB receiver contains a beamformer, the step of resolving the signal involves identifying components of the signal received at step 162 that have been transmitted from different directions.

Thus, in step 166, the eNodeB is able to identify the directions from which the different components have been transmitted. Specifically, in this example, the eNodeB is able to recognize that the different components have been transmitted from different UEs.

In step 168, the eNodeB sends an RA response on the downlink. In this example, the eNodeB transmitter includes a beamformer corresponding to the beamformer in the eNodeB receiver, and so the response can for example be transmitted in one or more of the directions identified in step 166, from which one or more components of the received signal were received.

Moreover, in this example, the RA response sent in step 168 is sent with low power, such that only a UE that is close to the eNodeB will be able to detect the RA response.

A terminal that has recently performed a RA attempt listens for a RA response within a certain time window after the preamble has been sent. In this illustrated example, only one of the three UEs, UE1, is able to receive the RA response transmitted in the identified direction at low power, as shown at step 170.

As defined in the LTE specifications (3GPP TS 36.321 and/or 36.300), this causes UE1 to transmit the RA message 3, containing amongst other things the Radio Resource Control (RRC) connection request, as shown at step 172.

As shown at step 174, the eNodeB receives a signal containing the RA message 3. Then, at step 176, the eNodeB allocates resources to UE1 and sends a message to UE1 granting the allocated resources to UE1.

In step 178, UE1 receives the message granting the allocated resources. This can be followed by further uplink and downlink transmission between UE1 and the eNodeB using the respective allocated resources.

Also, at step 180, the eNodeB sends a further RA response on the downlink, as defined in the LTE specifications (3GPP TS 36.321 and/or 36.300).

In this case, the eNodeB sends the RA response at medium power, such that only a UE that is somewhat close to the eNodeB will be able to detect the RA response. Although FIG. 5 shows step 180 taking place after step 176, it will be appreciated that the response at medium power may in principle be sent at any time after the response at low power has been sent (because any UE able to detect the signal at low power will already have detected that earlier signal).

However, if the eNodeB does delay sending the RA response at medium power, in step 180, until after allocating the resources in step 176, it is able to determine whether it has in fact allocated resources to all of the UEs from which it received RA preambles in the identified direction. If the eNodeB determines that there are no further UEs in the identified direction requesting resources, step 180 can be omitted.

A terminal that has recently performed a RA attempt listens for a RA response within a certain time window after the preamble has been sent. In this illustrated example, the first UE, UE1, is no longer listening for the RA response, and only UE2 (but not UE3) of the two remaining UEs is able to receive the RA response transmitted at medium power, as shown at step 182.

This causes UE2 to transmit the RA message 3, containing amongst other things the Radio Resource Control (RRC) connection request, as shown at step 184.

As shown at step 186, the eNodeB receives a signal containing the RA message 3. Then, at step 188, the eNodeB allocates resources to UE2 and sends a message to UE2 granting the allocated resources.

In step 190, UE2 receives the message granting the allocated resources. This can be followed by further uplink and downlink transmission between UE2 and the eNodeB using the respective allocated resources.

In this illustrated example, the eNodeB now determines that it has allocated resources to all of the UEs that sent RA preambles from the identified direction. It therefore does not need to send any further RA response in that identified direction at higher power.

Thus, at step 192, the eNodeB sends a further RA response on the downlink, as defined in the LTE specifications (3GPP TS 36.321 and/or 36.300). In this case, the eNodeB sends the RA response in a second of the directions identified in step 166, from which RA preamble components were transmitted.

If the eNodeB determined that there were multiple UEs transmitting RA preambles from the second identified direction, then it may attempt to differentiate between these UEs by transmitting RA responses at different powers, as just described. However, if the eNodeB determined that there was only one UE transmitting an RA preamble from the second identified direction, then the further RA response sent at step 192 may be sent at high power, to ensure that it is received by the UE.

A terminal that has recently performed a RA attempt listens for a RA response within a certain time window after the preamble has been sent. In this illustrated example, UE3 receives the RA response transmitted at step 192, as shown at step 194.

This causes UE3 to transmit the RA message 3, containing amongst other things the Radio Resource Control (RRC) connection request, as shown at step 196.

As shown at step 198, the eNodeB receives a signal containing the RA message 3. Then, at step 200, the eNodeB allocates resources to UE3 and sends a message to UE3 granting the allocated resources.

In step 202, UE3 receives the message granting the allocated resources. This can be followed by further uplink and downlink transmission between UE3 and the eNodeB using the respective allocated resources.

Thus, in this embodiment the eNodeB varies the direction and the transmission power over time to achieve a spatial partitioning of UEs with the same RA preamble. The eNodeB sends the RA response message several times at different time instants with different transmission directions and/or power levels. This may allow just one UE to receive successfully the first RA response, which would allow the UE to proceed with sending the RA message 3. Subsequent to transmitting the first RA response, the eNodeB transmits the same RA response in a different direction and/or with higher power, armed at one or more other UE. The UE(s) which have successfully received earlier RA responses will not look for further RA responses and, thus, are unaffected by subsequent RA responses. This process can be repeated several times depending on what kind of load the network is experiencing. In this way, UEs with the same RA preamble are separated such that collisions or failure rates are reduced.

This process is repeated depending on the network requirements, whether it is latency or QoS. Thus, the number of zones created can vary, and for UEs in one zone with a similar preamble, a collision might occur and a new attempt of the RA procedure should be initiated. The availability of information about UE transmission powers, e.g., through Power Headroom Reports, can be used, e.g., in determining the transmission powers and/or UE locations, to further improve the accuracy/precision/resolution of the procedure. Having distinguished between the uplink RA messages from the UEs, the eNodeB can either transmit the RA message 4 on different time instants, or on different frequencies regardless of time. In general, once the UEs are distinguished, time, frequency, and/or spatial separation can be used for further communication between the UE and eNodeB, thus avoiding collisions.

The embodiments described above arm at reducing radio access latency and the failed access attempts which could occur due to collisions in the contention-based RA procedure. This is done by branching the RA procedure to better handle the RA of UEs which have not yet obtained or have lost their uplink time synchronization, thus increasing the contention resolution efficiency. As a consequence of this improved handling, the Physical Random Access CHannel (PRACH) capacity is better utilized and this allows the handling of high RA intensities. This assists uplink transmissions necessitating RA for proper traffic prioritization/handling by the network and in high load and emergency scenarios with many UEs trying to acquire transmission resources. In addition, the load on the Physical Uplink Shared CHannel (PUSCH), Physical Downlink Shared CHannel (PDSCH), and Physical Downlink Control CHannel (PDCCH) may be reduced. The freed up PRACH, PDCCH, PDSCH and/or PUSCH resources can be used for other data/signaling instead. In this manner, the RAN preserves its control on the Quality of Service, resulting in an improved overall network performance.

The efficiency of the embodiments described above can be further improved by the eNodeB detecting (e.g., based on information about timing, direction and/or energy/power) that its reception of multiple copies, or instances, of a RA preamble is not due to, for example, multipath propagation, but rather due to the presence of many UEs which happened to use the same preamble. In this case, the eNodeB can adapt the separation capacity or number of access attempts with the same preamble which may be distinguished. Accuracy of information used and of the detection can be improved using information from other sources (e.g., other antennas, other eNodeBs, other UEs, etc.). Application of advanced transmission and/or reception techniques such as Coordinated Multi-Point transmission and/or reception can also be combined with the embodiments described above.

According to an aspect of the invention, there is provided a method, for use in an access node of a cellular communications network. The method comprises: receiving signals comprising multiple instances of an uplink Random Access message; spatially resolving the received signals to identify directions from which the uplink Random Access message was received; and transmitting distinct downlink Random Access messages in the identified directions from which the uplink Random Access message was received.

The uplink Random Access message may comprise a Random Access preamble. The method may comprise transmitting the distinct downlink Random Access messages granting different resources for subsequent uplink messages. The uplink Random Access message may be a Random Access Message 3. The access node may be an eNodeB. The multiple instances of the uplink Random Access message may be identical, or may have different content.

According to an aspect of the invention, there is provided a method, for use in an access node of a cellular communications network. The method comprises: receiving signals comprising multiple instances of an uplink Random Access message; and transmitting distinct downlink Random Access messages in multiple directions.

The uplink Random Access message may comprise a Random Access preamble. The method may comprise transmitting the distinct downlink Random Access messages granting different resources for subsequent uplink messages. The method may comprise transmitting the distinct downlink Random Access messages granting different resources for subsequent uplink Message 3 transmissions. The access node may be an eNodeB. The multiple instances of the uplink Random Access message may be identical, or may have different content.

According to an aspect of the invention, there is provided a method, for use in an access node of a cellular communications network. The method comprises: receiving signals comprising multiple instances of an uplink Random Access message; transmitting a first downlink Random Access message in response to the received signals at a first power; and subsequently transmitting a second downlink Random Access message in response to the received signals at a second power, wherein the second power is higher than the first power.

The uplink Random Access message may comprise a Random Access preamble. The uplink Random Access message may be a Random Access Message 3. The access node may be an eNodeB. The multiple instances of the uplink Random Access message may be identical, or may have different content.

According to an aspect of the invention, there is provided a method, for use in an access node of a cellular communications network. The method comprises: receiving signals comprising multiple instances of an uplink Random Access message; spatially resolving the received signals to identify approximate locations from which the uplink Random Access message was transmitted; and transmitting distinct downlink Random Access messages for reception in the identified approximate locations from which the uplink Random Access message was transmitted.

The method may comprise spatially resolving the received signals to identify directions from which the uplink Random Access message was transmitted. The method may comprise spatially resolving the received signals to identify approximate distances from which the uplink Random Access message was transmitted. The uplink Random Access message may comprise a Random Access preamble. The uplink Random Access message may be a Random Access Message 3. The access node may be an eNodeB. The multiple instances of the uplink Random Access message may be identical, or may have different content.

According to an aspect of the invention, there is provided an access node, for use in a cellular communications network. The access node comprises a processor and a memory, for storing instructions for causing an access node to operate in accordance with any one of the preceding aspects.

According to an aspect of the invention, there is provided an access node for a cellular communications network. The access node comprises means adapted to: receive signals comprising multiple instances of an uplink Random Access message; spatially resolve the received signals to identify directions from which the uplink Random Access message was received; and transmit distinct downlink Random Access messages in the identified directions from which the uplink Random Access message was received.

The uplink Random Access message may comprise a Random Access preamble. The means which are adapted to transmit distinct downlink Random Access messages may comprise means adapted to transmit the distinct downlink Random Access messages granting different resources for subsequent uplink messages. The uplink Random Access message may be a Random Access Message 3.

According to an aspect of the invention, there is provided an access node for use in a cellular communications network. The access node comprises means adapted to: receive signals comprising multiple instances of an uplink Random Access message; and transmit distinct downlink Random Access messages in multiple directions.

The uplink Random Access message may comprise a Random Access preamble. The means which are adapted to transmit distinct downlink Random Access messages may comprise means adapted to transmit the distinct downlink Random Access messages granting different resources for subsequent uplink messages. The means which are adapted to transmit distinct downlink Random Access messages may comprise means adapted to transmit the distinct downlink Random Access messages granting different resources for subsequent uplink Message 3 transmissions.

According to an aspect of the invention, there is provided an access node for use in a cellular communications network. The access node comprises means adapted to: receive signals comprising multiple instances of an uplink Random Access message; transmit a first downlink Random Access message in response to the received signals at a first power; and subsequently transmit a second downlink Random Access message in response to the received signals at a second power, wherein the second power is higher than the first power.

The uplink Random Access message may comprise a Random Access preamble. The uplink Random Access message may be Random Access Message 3.

According to an aspect of the present invention, there is provided an access node for use in a cellular communications network. The access node comprises means adapted to: receive signals comprising multiple instances of an uplink Random Access message; spatially resolve the received signals to identify approximate locations from which the uplink Random Access message was transmitted; and transmit distinct downlink Random Access messages for reception in the identified approximate locations from which the uplink Random Access message was transmitted.

The means may be adapted to spatially resolve the received signals to identify directions from which the uplink Random Access message was transmitted.

The means may be adapted to spatially resolve the received signals to identify approximate distances from which the uplink Random Access message was transmitted.

The uplink Random Access message may comprise a Random Access preamble. The uplink Random Access message may be Random Access Message 3. The access node may be eNodeB. The multiple instances of the uplink Random Access message may be identical. The multiple instances of the uplink Random Access message may have different content.

According to an aspect of the invention there is provided an access node for a cellular communications network, comprising: a processor; and a memory, said memory comprising instructions executable by said processor, whereby the access node is operative to: receive signals comprising multiple instances of an uplink Random Access message; spatially resolve the received signals to identify directions from which the uplink Random Access message was received; and transmit distinct downlink Random Access messages in the identified directions from which the uplink Random Access message was received.

The uplink Random Access message may comprise a Random Access preamble. The access node may be operative to transmit the distinct downlink Random Access messages granting different resources for subsequent uplink messages. The uplink Random Access message may be a Random Access Message 3.

According to an aspect of the invention, there is provided an access node for a cellular communications network. The access node comprises: a processor; and a memory, said memory comprising instructions executable by said processor, whereby the access node is operative to: receive signals comprising multiple instances of an uplink Random Access message; and transmit distinct downlink Random Access messages in multiple directions.

The uplink Random Access message may comprise a Random Access preamble. The access node may be operative to transmit the distinct downlink Random Access messages granting different resources for subsequent uplink messages. The access node may be operative to transmit the distinct downlink Random Access messages granting different resources for subsequent uplink Message 3 transmissions.

According to an aspect of the invention, there is provided an access node for a cellular communications network. The access node comprises: a processor; and a memory, said memory comprising instructions executable by said processor, whereby the access node is operative to: receive signals comprising multiple instances of an uplink Random Access message; transmit a first downlink Random Access message in response to the received signals at a first power; and subsequently transmit a second downlink Random Access message in response to the received signals at a second power, wherein the second power is higher than the first power.

The uplink Random Access message may comprise a Random Access preamble. The uplink Random Access message may be a Random Access Message 3.

According to an aspect of the invention there is provided, an access node for a cellular communications network. The access node comprises: a processor; and a memory, said memory comprising instructions executable by said processor, whereby the access node is operative to: receive signals comprising multiple instances of an uplink Random Access message; spatially resolve the received signals to identify approximate locations from which the uplink Random Access message was transmitted; and transmit distinct downlink Random Access messages for reception in the identified approximate locations from which the uplink Random Access message was transmitted.

The access node may be operative to spatially resolve the received signals to identify directions from which the uplink Random Access message was transmitted.

The access node may be operative to spatially resolve the received signals to identify approximate distances from which the uplink Random Access message was transmitted.

The uplink Random Access message may comprise a Random Access preamble. The uplink Random Access message may be a Random Access Message 3. The access node may be an eNodeB. The multiple instances of the uplink Random Access message may be identical. The multiple instances of the uplink Random Access message may have different content.

According to an aspect of the invention, there is provided a computer program product, comprising code for causing an access node to operate in accordance with any of the methods according to preceding aspects.

This provides a method which arms to reduce collisions between random access attempts, and therefore improve the random access load utilization, thus reducing latency and limiting failure rates in random access attempts. Even if there is a collision between initial messages in random access attempts, the collision is resolved before subsequent messages. This further provides a device operating in accordance with the method.

According to a further aspect, there is provided an access node for use in a cellular communications network comprising: a receiving module for receiving signals comprising multiple instances of an uplink Random Access message; a resolving module for spatially resolving the received signals to identify directions from which the uplink Random Access message was received; and a transmitting module for transmitting distinct downlink Random Access messages in the identified directions from which the uplink Random Access message was received.

According to a further aspect of the invention, there is provided an access node for use in a cellular communications network, comprising: a receiving module for receiving signals comprising multiple instances of an uplink Random Access message; and a transmitting module for transmitting distinct downlink Random Access messages in multiple directions.

According to a further aspect of the invention, there is provided an access node for use in a cellular communications network, comprising: a receiving module for receiving signals comprising multiple instances of an uplink Random Access message; a transmitting module for transmitting a first downlink Random Access message in response to the received signals at a first power; and subsequently transmitting a second downlink Random Access message in response to the received signals at a second power, wherein the second power is higher than the first power.

According to a further aspect of the invention, there is provided an access node for use in a cellular communications network, comprising: a receiving module for receiving signals comprising multiple instances of an uplink Random Access message; a resolving module for spatially resolving the received signals to identify approximate locations from which the uplink Random Access message was transmitted; and a transmitting module for transmitting distinct downlink Random Access messages for reception in the identified approximate locations from which the uplink Random Access message was transmitted.

The modules recited above may in some embodiments be implemented as computer programs running on one or more processors.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Method steps can be performed in any desired order, unless a particular order is specified. Any reference numerals or labels in the claims shall not be construed so as to limit their scope.

The invention claimed is:

1. A method, for use in an access node of a cellular communications network, the method comprising:
   receiving signals comprising multiple instances of an uplink Random Access message;
   spatially resolving the received signals to identify approximate locations from which the uplink Random Access message was transmitted;
   identifying approximate distances from which the uplink Random Access Message was transmitted; and
   transmitting distinct downlink Random Access messages for reception in the identified approximate locations from which the uplink Random Access message was transmitted;
   wherein transmitting the distinct downlink Random Access messages comprises transmitting a first downlink Random Access message at a first power level based on a first approximate distance from which a first Random Access uplink message was transmitted and transmitting a second downlink Random Access message at a second power level based on a second approximate distance from which a second Random Access uplink message was transmitted.

2. The method of claim 1, comprising spatially resolving the received signals to identify directions from which the uplink Random Access message was transmitted.

3. The method of claim 1, wherein the uplink Random Access message comprises a Random Access preamble.

4. The method of claim 1, wherein the access node is an eNodeB.

5. The method of claim 1, wherein the multiple instances of the uplink Random Access message are identical.

6. The method of claim 1, wherein the multiple instances of the uplink Random Access message have different content.

7. An access node for a cellular communications network, comprising:
   a processor; and
   a memory, said memory comprising instructions executable by said processor, whereby the access node is operative to:
   receive signals comprising multiple instances of an uplink Random Access message;
   spatially resolve the received signals to identify approximate locations from which the uplink Random Access message was transmitted;
   identify approximate distances from which the uplink Random Access message was transmitted; and
   transmit distinct downlink Random Access messages for reception in the identified approximate locations from which the uplink Random Access message was transmitted, wherein each distinct downlink Random Access messages is transmitted with a power level selected based on the identified approximate distance from which the corresponding uplink Random Access message was transmitted.

8. The access node of claim 7, wherein the instructions are such that the access node is operative to spatially resolve the received signals to identify directions from which the uplink Random Access message was transmitted.

9. The access node of claim 7, wherein the uplink Random Access message comprises a Random Access preamble.

10. The access node of claim 7, wherein the access node is an eNodeB.

11. The access node of claim 7, wherein the multiple instances of the uplink Random Access message are identical.

12. The access node of claim 7, wherein the multiple instances of the uplink Random Access message have different content.

13. A non-transitory computer-readable medium comprising, stored thereupon, code configured for execution by a processor of an access node and configured to cause the access node to:
- receive signals comprising multiple instances of an uplink Random Access message;
- spatially resolve the received signals to identify approximate locations from which the uplink Random Access message was transmitted;
- identify approximate distances from which the uplink Random Access message was transmitted; and
- transmit distinct downlink Random Access messages for reception in the identified approximate locations from which the uplink Random Access message was transmitted, wherein each distinct downlink Random Access messages is transmitted with a power level selected based on the identified approximate distance from which the corresponding uplink Random Access message was transmitted.

* * * * *